United States Patent
Jacobson et al.

(10) Patent No.: US 9,542,247 B2
(45) Date of Patent: Jan. 10, 2017

(54) CONTENT SHARING BETWEEN SANDBOXED APPS

(71) Applicant: Microsoft Technology Licensing, LLC, Redmond, WA (US)

(72) Inventors: Neil Adam Jacobson, Acton, MA (US); Daniel Floyd Emerson, Gorham, ME (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 68 days.

(21) Appl. No.: 14/490,883

(22) Filed: Sep. 19, 2014

(65) Prior Publication Data

US 2016/0085602 A1 Mar. 24, 2016

(51) Int. Cl.
 G06F 21/53 (2013.01)
 G06F 9/54 (2006.01)
 G06F 21/62 (2013.01)

(52) U.S. Cl.
 CPC ............... *G06F 9/546* (2013.01); *G06F 9/547* (2013.01); *G06F 21/53* (2013.01); *G06F 21/629* (2013.01)

(58) Field of Classification Search
 USPC ................. 726/1, 7, 22, 26, 27, 30; 713/165
 See application file for complete search history.

(56) References Cited

U.S. PATENT DOCUMENTS

| | | | | |
|---|---|---|---|---|
| 8,549,656 B2 * | 10/2013 | Blaisdell | ................. | G06F 21/12 726/1 |
| 2010/0011447 A1 * | 1/2010 | Jothimani | ........... | G06F 21/6209 726/27 |
| 2010/0306770 A1 * | 12/2010 | Frank | ................... | G06F 9/45558 718/1 |
| 2011/0179483 A1 * | 7/2011 | Paterson | ................. | G06F 21/56 726/22 |
| 2013/0007576 A1 * | 1/2013 | Lund | ................... | H04N 21/4307 715/203 |
| 2013/0191830 A1 * | 7/2013 | Mann | ........................ | G06F 9/54 718/1 |
| 2013/0219176 A1 * | 8/2013 | Akella | ................ | H04L 63/0815 713/165 |
| 2013/0273879 A1 * | 10/2013 | Eisen | .................... | H04W 12/08 455/405 |

(Continued)

OTHER PUBLICATIONS

Morgenstern, David, "Improved inter-app sharing services coming to iOS?", Published on: Oct. 8, 2012, Available at: http://www.zdnet.com/improved-inter-app-sharing-services-coming-to-ios-7000005349/.
Smith, Dave, "Why You Should Be Excited for Extensions in iOS 8", Jun. 4, 2014, Available at: http://www.businessinsider.in/Why-You-Should-Be-Excited-For-Extensions-In-iOS-8/articleshow/36020642.cms.

(Continued)

*Primary Examiner* — Sayed Beheshti Shirazi
(74) *Attorney, Agent, or Firm* — Kate Drakos; Micky Minhas

(57) ABSTRACT

Embodiments may include sharing application management data between sandboxed applications on a device. A method includes sending application management data from a first sandboxed application in a first sandbox on the device to a sharing service external to the first sandbox. The method further includes receiving at a second sandboxed application in a second sandbox on the device, a representation of the application management data. Based on the representation of the application management data, the method includes performing an application management function.

18 Claims, 3 Drawing Sheets

(56) References Cited

U.S. PATENT DOCUMENTS

| | | | | |
|---|---|---|---|---|
| 2013/0275560 A1* | 10/2013 | Bestmann | H04L 41/0803 | 709/219 |
| 2013/0318157 A1* | 11/2013 | Harrison | H04L 67/42 | 709/203 |
| 2015/0100742 A1* | 4/2015 | Botzer | G06F 3/0619 | 711/153 |
| 2015/0154293 A1* | 6/2015 | Lu | G06F 9/485 | 707/770 |
| 2015/0347200 A1* | 12/2015 | Fadel | G06F 21/53 | 719/319 |
| 2015/0347748 A1* | 12/2015 | Krstic | G06F 21/53 | 726/1 |
| 2015/0347749 A1* | 12/2015 | Kiehtreiber | G06F 21/53 | 726/26 |
| 2016/0036894 A1* | 2/2016 | Collins | H04L 67/18 | 709/201 |

OTHER PUBLICATIONS

Goetz, Geoffrey, "icloud 101: Keep Track of Your iDevices with Find My iPhone", Retrieved at <<https://gigaom.com/2012/09/28/icloud-101-keep-track-of-your-idevices-with-find-my-iphone/>>, Sep. 28, 2012, 10 Pages.

"International Search Report & Written Opinion Issued in PCT Application No. PCT/US2015/050547", Mailed Date: Nov. 26, 2015, 12 Pages.

"Second Written Opinion Issued in PCT Application No. PCT/US2015/050547", Mailed Date : Apr. 4, 2016, 6 Pages.

"International Preliminary Report on Patentability Issued in PCT Application No. PCT/US2015/050547", Mailed Date: Jul. 15, 2016, 7 Pages.

* cited by examiner

CONTENT SHARING BETWEEN SANDBOXED APPS

BACKGROUND

Background and Relevant Art

On modern software platforms, applications are often sandboxed to prevent one application from negatively impacting another application. A specific example is application sandboxing, such as that implement in iOS, available from Apple Corporation of Cupertino, Calif. By design, sandboxing limits the ability of applications to communicate and share data. For example, applications are not able to share common data stores between the applications. In another example, applications are not able to directly communicate with each other without platform restrictions being applied (if communication is allowed at all). Platforms such as iOS enable limited sharing between apps via a shared keychain, which allow small amounts of data to be shared between applications published by the same company only.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for sharing application management data between sandboxed applications on a device. The method includes sending application management data from a first sandboxed application in a first sandbox on the device to a sharing service external to the first sandbox. The method further includes receiving at a second sandboxed application in a second sandbox on the device, a representation of the application management data. Based on the representation of the application management data, the method includes performing an application management function.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Embodiments herein implement an intra-sandboxed application communication system which allows communication between sandboxed applications by communicating with an external sharing service that is external to the sandboxes. Thus, embodiments may implement the ability to securely connect to a remote (or local) component for the purposes of communicating with a local (e.g. on the same device) sandboxed application. Embodiments may include the ability to send data via a remote (or local) component between two local sandboxed applications. Embodiments may include the ability to synchronize data via a remote (or local) component between two local sandboxed applications. Embodiments may include the ability to invoke operations via a remote (or local) component in a local sandboxed application from a different local sandboxed application. Details are now illustrated.

Figure 1:
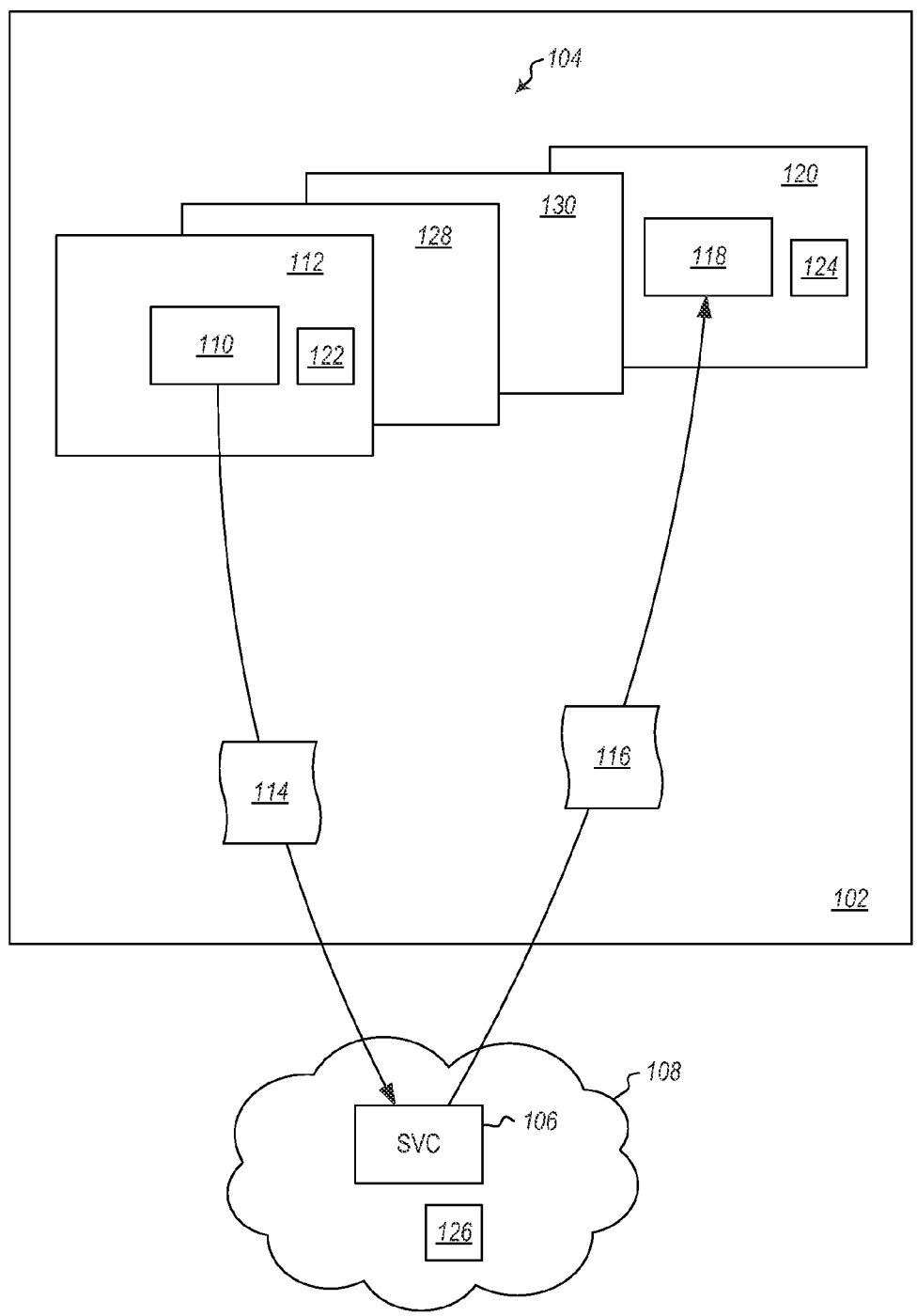
FIG. 1 illustrates a device with sandboxed applications and a remote management service.

Referring now to FIG. 1, an example is illustrated. FIG. 1 illustrates a device 102. The device 102 may be, for example, a mobile device such as a phone, tablet, etc. The device 102 may alternatively or additionally be other types of less mobile or immobile devices, such as any one of a number of different various computing systems.

The device 102 includes a plurality 104 of sandboxed applications. In particular, various applications may be in different sandboxes. Sandboxing is one or more mechanisms for separating running programs.

While sandboxing prevents direct communication between applications, embodiments can share application management data between sandboxed applications, sandboxed in different sandboxes by sharing through a service 106 external to the sandboxes. In FIG. 1, the service 106 is illustrated as external to the device 102. In this example, the service 106 is illustrated as being part of a cloud service 108. However, in an alternative example, as illustrated in FIG. 2, the service 106 is illustrated as being implemented on the device 102 itself.

Returning now to the example shown in FIG. 1, a first sandboxed application 110 in a first sandbox 112 sends application management data 114 to the service 106. The service 106 sends a representation 116 of the application management data 114 to a second sandboxed application 118 in a second sandbox 120. In some embodiments, the representation 116 of the application management data 114 may simply be the application management data 114 with little or no change. Thus, by using a service 106 that is external to the sandboxes 112 and 120 (or any of the sandboxes for the plurality 104 of sandboxed applications) application management data can be shared between the sandboxed applications.

The application management data 114 may be transmitted in a number of different ways. For example, in some embodiments, the application management data 114 may flow from storage 122 of the first sandboxed application through the service 106 (without being stored) and to the second sandboxed application 118 where a representation 116 of the application management data 114 is stored in application storage 124. In an alternative embodiment, a store and forward scheme may be implemented where the application management data 114 is sent from storage 122 of the first sandboxed application 110 through the service 106, where it is stored in service storage 126. A representation 116 of the application management data 114 is sent from the service storage 126 to the application storage 124 for the second sandboxed application 118.

Figure 2:
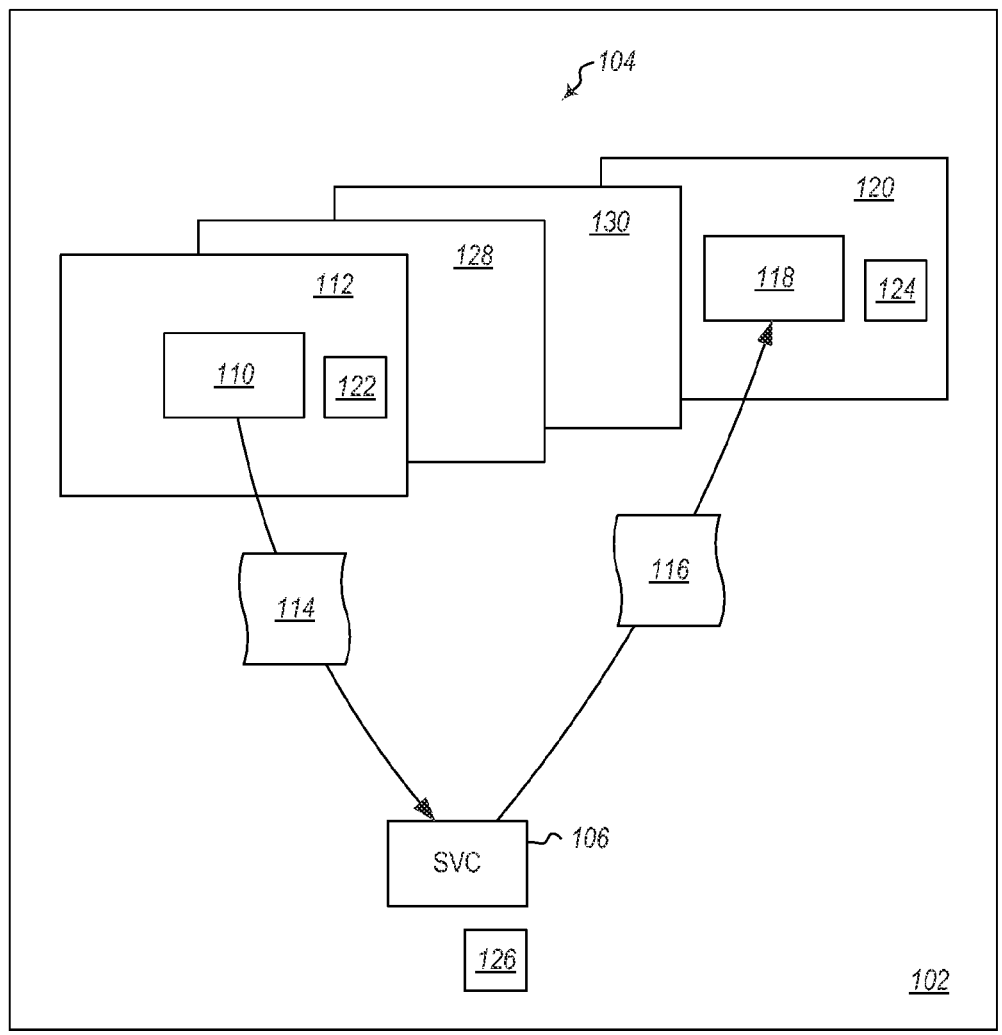
FIG. 2 illustrates a device with sandboxed applications and a management service on the device.

Note that while the examples illustrated in FIGS. 1 and 2 show sending application management data from the first sandboxed application 110 to the second sandboxed application 118, it should be appreciated that a sandboxed application may send the same application management data 114 to a plurality of different sandboxed applications (such as applications 128 and/or 130).

When the second sandboxed application 118 receives the representation 116 of the application management data 114, the second sandboxed application 118 may perform an application management function. Various different application management functions may be performed.

For example, in some embodiments, the application management function may include wiping data from the second sandboxed application 118. Wiping may include, for example, deleting some set of data. Alternatively or additionally, wiping may be performed by encrypting data in a way such that the data cannot be recovered. For example, the data may be encrypted and the description key destroyed. Some embodiments may encrypt data and then delete the data. Various other wiping processes may be employed within the scope of embodiments of the present invention.

Illustrating now one example, a sandboxed application may detect that a device on which it (and other sandboxed applications) is installed is out of compliance with respect to some management policy. Thus, the application may determine that the device should be wiped of data protected by the management policy. The application can then send policy management information to various other applications, which results in those various applications wiping data from their application storage. A sandboxed application is an application that is either wrapped with an application management layer or is compiled with an application management SDK.

Alternatively or additionally, the application management function may include synchronizing a data encryption key between the first and second sandboxed applications. For example, in some embodiments, a data encryption public key may be used to encrypt data. This key can be shared between the applications in the application management data 114. In some embodiments, an application may be able to Share clipboard data. Illustratively, embodiments may be able to copy data in the first sandboxed application's clipboard which is sent to the second sandboxed application's clipboard. This data can then be pasted as appropriate by the second sandboxed application. This clipboard sharing may be used to share the encryption key, or other data as appropriate.

In some embodiments, the application management function may include synchronizing a single sign-on credential. Thus, for example, an application may need to sign into an account far certain functionality. It may be desirable to have all applications use a single credential for signing in to the account or a set of accounts. This credential can be shared among the applications using the application management data sharing functionality described above.

In some embodiments, the application management data may be calculated by the first sandboxed application performing a management computation to generate the application management data. In some such embodiments, the application management function performed on the second sandboxed application includes storing the management data, which is a computation result, and using the management data as if the second sandboxed application had performed the management computation themselves. Examples of such computations may be determination of jailbroken or rooted status, geofencing compliance results, etc. This may be particularly useful when such management computations are expensive computationally to perform. Alternatively, such computation result sharing may be useful when such a result is non-deterministic, but useful for different applications. For example, the first sandboxed application 110 may compute such a result, and the result may be of interest to other sandboxed applications in the plurality 104 of sandboxed applications. However, if any of those applications were to compute the result at a later time, they would obtain a different result as a result of the non-deterministic nature of the computation. Thus, it may be useful for the first sandboxed application to be able to share the result with other sandboxed applications if the first computed result is of interest to the other sandboxed applications.

Embodiments may be particularly useful in devices implementing the iOS platform available from Apple Corporation of Cupertino, Calif. That particular platform implements particularly strict sandboxing between applications. The following illustrates one very specific example to implement the application management data sharing described above. In this example, a device has a sending application. This is the sandboxed application initiating the communication. The device also has a receiving application. This is the sandboxed application targeted by the communication. A service is implemented. In some embodiments, the service may be a remote component. For example, in some embodiments, this may be an Intune service, available from Microsoft Corporation of Redmond, Wash. that coordinates the communication between the sending and receiving applications. In other embodiments, the service may be local to the device, as illustrated in FIG. 2.

Some embodiments facilitate communication using a communication schema. The communication schema may be, for example, a versioned XML schema that describes the communication behaviors and contents.

The following illustrates a basic workflow example. An Intune component (or other management component) embedded within the sending application communicates to the service (such as the Intune Service) to initiate data sharing or invoke an operation. The service would the perform one of two actions depending on the communication schema. One action, labelled "active" would send a notification to the receiving application on the device that would invoke the receiving application to process the contents of the communication schema. The other action, labelled "passive", would store the communication schema contents until they were retrieved by the receiving application.

A service component (such as an Intune component) embedded within the receiving application would process the communication. Based on the contents of the schema, it would access a file or data buffer from the service, perform an operation and/or send a response to the sending application via the service.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
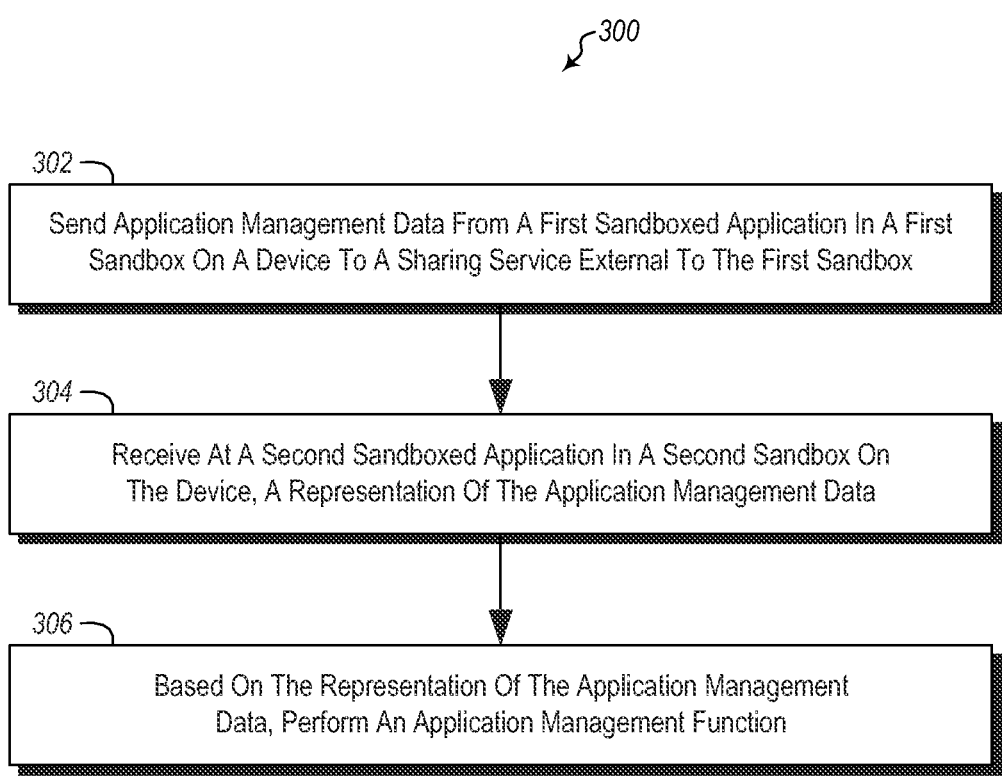
FIG. 3 illustrates a method of sharing application management data between sandboxed applications on a device.

Referring now to FIG. 3, a method 300 is illustrated. The method 300 may be practiced in a computing environment. The method 300 includes acts for sharing application management data between sandboxed applications on a device. For example, as illustrated in FIGS. 1 and 2, the first sandboxed application and the second sandboxed application on the device (or indeed any of the sandboxed applications in the plurality of sandboxed applications) may share application management data with each other. The method 300 may include sending application management data from a first sandboxed application in a first sandbox on the device to a sharing service external to the first sandbox (act 302).

The method 300 may further include, receiving at a second sandboxed application in a second sandbox on the device, a representation of the application management data (act 304).

The method 300 may further include, based on the representation of the application management data, performing an application management function (act 306).

The method 300 may be practiced where the application management function comprises wiping data from the second sandboxed application. Wiping may include, for example, deleting data, encrypting data and then deleting the encrypted data, encrypting data and discarding the decryption key, or any of a number of other actions. In some embodiments, rather than wiping data, embodiments may simply block access to data.

Such embodiments may be useful for wiping data for several different sandboxed applications when one of the sandboxed applications is notified to wipe data. In some embodiments, this may be useful when a rogue user is using a device that is supposed to be managed. The device may have a management profile that allows application data to be wiped if the device goes out of compliance. The user may wish to run an out of compliance device, but still wants to have access to certain corporate assets and applications which require that the user use a managed device. Thus, the user may put the device into compliance when originally registering the device with a corporate management service. Once the user has the desired access, the user may make cause the device to be in a state that is out of compliance. However, the user may limit the device connections when using certain applications to prevent wiping of the device. However, if the user uses a sandboxed application in a fashion that triggers a wipe for that application, where that application can communicate with other sandboxed applications, that sandboxed application can initiate a wipe on the other sandboxed applications.

The method 300 may be practiced where the application management function comprises synchronizing a data encryption key between the first and second sandboxed applications. For example, as described above, such sharing may be accomplished through a clipboard sharing functionality.

The method 300 may be practiced where the application management function comprises synchronizing a single sign-on credential between the first and second sandboxed applications on the device.

The method 300 may further include the first sandboxed application performing a management computation to generate the application management data. In some such embodiments, the application management function on the second sandboxed application includes storing the management data (which is the management computation result) and using the management data as if the second sandboxed application had performed the computation itself.

The method 300 may be practiced where the device includes a plurality of sandboxed applications that are configured to communicate application management data to any of the sandboxed application in the plurality of sandboxed applications through the sharing service. It should be appreciated that the plurality sandboxed applications can include several sandboxed applications, including more than just two sandboxed applications. A sandboxed application may be able to communicate, using the service, with multiple sandboxed applications. In some such embodiments, one or more of the application are configured to identify a subset of the plurality of applications that should receive the representation of the application management data. In an alternative embodiment, the sharing service is configured to identify a subset of the plurality of application that should receive the representation of the application management data. These determinations may be based on data types. For example, wipe data may be sent to all applications in the plurality of applications. Similarly, the single sign on credential may be sent to all applications in the plurality of application. In contrast, only certain application management data may be sent if applications belong to a family of applications, such as productivity applications. In an alternative or additional embodiment, whether to send application management data may be determined by the security level of applications or business criticality of applications. Virtually any imaginable criteria may be used to determine if application management data is sent to an application.

The method 300 may further include the second sandboxed application sending a response back to the first sandboxed application through the sharing service. This can allow the first sandboxed application or the management service to create reports for auditing or other purposes.

The method 300 may be practiced where sending the application management data is performed by sending the application management data defined by a schema to define characteristics of the application management data. For example, the schema may be able to identify the application management data as including one or more of shared data, synchronized data, a management operation, a result of a computation based on a management computation, a recipient list identifying which applications should receive the application management data, etc.)

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of sharing application management data between sandboxed applications on a device, the method implemented using one or more hardware processors comprising:

a first sandboxed application performing a management computation to generate application management data, wherein the application management data includes determination of geofencing compliance, and determination of a non-deterministic result that a second sandboxed application would not be able to compute at a later time, sending the application management data from the first sandboxed application in a first sandbox on the device to a sharing service external to the first sandbox;

receiving, from the sharing service, at the second sandboxed application in a second sandbox on the device, the application management data;

storing the application management data, and using the application management data as if the second sandboxed application had performed the computation itself.

2. The method of claim 1, further comprising, based on the application management data, wiping data from the second sandboxed application.

3. The method of claim 1, further comprising, using the sharing service to synchronize a data encryption key between the first and second sandboxed applications.

4. The method of claim 1, further comprising, using the sharing service to synchronize a single sign-on credential between the first and second sandboxed applications on the device.

5. The method of claim 1, further comprising the second sandboxed application sending a response back to the first sandboxed application through the sharing service.

6. The method of claim 1, wherein sending the application management data is performed by sending the application management data defined in a schema to define characteristics of the application management data.

7. One or more physical computer readable storage media devices comprising computer executable instructions that when executed by one or more processors cause the following to be performed:

a sharing service, receiving application management data from a first sandboxed application in a first sandbox on a device; and the sharing service sending to a second sandboxed application in a second sandbox on the device the application management data, wherein the application management data includes determination of geofencing compliance, and determination of a non-deterministic result that the second sandboxed application would not be able to compute at a later time; and receiving from the sharing service at the second sandboxed application in the second sandbox on the device, the application management data;

wherein the second sandboxed application stores, and uses the received application management data as if the second sandboxed application had performed the computation itself.

8. The one or more physical computer readable storage media devices of claim 7, wherein the second sandboxed application wipes data from the second sandboxed application as a result of receiving the application management data.

9. The one or more physical computer readable storage media devices of claim 7, wherein the second sandboxed application synchronizes a data encryption key between the first and second sandboxed applications.

10. The one or more physical computer readable storage media devices of claim 7, wherein the second sandboxed application synchronizes a single sign-on credential between the first and second sandboxed applications on the device.

11. A computing device, wherein the computing device implemented using one or more hardware processors comprises:
 a first sandboxed application in a first sandbox on the computing device;
 a second sandboxed application in a second sandbox on the computing device, wherein the first sandboxed application is configured to perform a management computation to generate application management data, wherein the application management data includes determination of geofencing compliance, and determination of a non-deterministic result that a second sandboxed application would not be able to compute at a later time;
 a sharing service, wherein the sharing service is configured to:
  receive application management data from the first sandboxed application in the first sandbox on the computing device; and
  send to the second sandboxed application in the second sandbox on the computing device, the application management data; and
 wherein second sandboxed application is configured to store the application management data, and use the application management data as if the second sandboxed application had performed the computation itself.

12. The computing device of claim 11, wherein the second sandboxed application is configured to wipe data from the second sandboxed application based on the application management data.

13. The computing device of claim 11, wherein the sharing service is configured to share a data encryption key between the first and second sandboxed applications.

14. The computing device of claim 11, wherein the sharing service is configured to synchronize a single sign-on credential between the first and second sandboxed applications on the computing device.

15. The computing device of claim 11, wherein the device comprises a plurality of sandboxed applications that are configured to communicate application management data to any of the sandboxed application in the plurality of sandboxed applications through the sharing service.

16. The computing device of claim 15, wherein one or more of the application are configured to identify a subset of the plurality of applications that should receive the application management data.

17. The computing device of claim 15, wherein the sharing service is configured to identify a subset of the plurality of application that should receive the application management data.

18. The computing device of claim 15, wherein the second sandboxed application is configured to send a response back to the first sandboxed application through the sharing service.

* * * * *